(12) United States Patent
Fesbinder

(10) Patent No.: US 10,346,549 B1
(45) Date of Patent: Jul. 9, 2019

(54) SINGLE-LINE DISPLAY OF COMPOSITE-TEXT

(71) Applicant: Read TwoGether Ltd., Jerusalem (IL)

(72) Inventor: David Allen Fesbinder, Jerusalem (IL)

(73) Assignee: READ TWOGETHER LTD., Jerusalem (IL)

( * ) Notice: Subject to any disclaimer, the term of this patent is extended or adjusted under 35 U.S.C. 154(b) by 0 days.

(21) Appl. No.: 16/114,385

(22) Filed: Aug. 28, 2018

(51) Int. Cl.
*G06F 17/28* (2006.01)
*G09B 19/06* (2006.01)

(52) U.S. Cl.
CPC ........ *G06F 17/289* (2013.01); *G06F 17/2863* (2013.01); *G09B 19/06* (2013.01)

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC .......................................................... 704/2–8
See application file for complete search history.

(56) References Cited

U.S. PATENT DOCUMENTS

| | | | |
|---|---|---|---|
| 4,774,666 A | 9/1988 | Miyao et al. | |
| 6,778,950 B2 * | 8/2004 | Gohari | G06F 17/2827 704/2 |
| 6,901,367 B1 | 5/2005 | Berstis et al. | |
| 7,174,287 B2 * | 2/2007 | Yamada | G06F 9/454 704/2 |
| 7,890,525 B2 | 2/2011 | Lu et al. | |
| 7,974,832 B2 * | 7/2011 | Furuuchi | G06F 17/30896 704/2 |
| 8,095,355 B2 * | 1/2012 | Rosart | G06F 17/211 704/2 |
| 8,144,990 B2 * | 3/2012 | Englund | G06F 17/289 382/181 |
| 8,315,850 B2 * | 11/2012 | Furuuchi | G06F 17/30896 704/2 |
| D706,803 S * | 6/2014 | Rogowski | D14/486 |
| 8,761,513 B1 * | 6/2014 | Rogowski | G06F 17/2854 382/181 |
| 8,965,129 B2 * | 2/2015 | Rogowski | G06F 17/289 382/181 |
| 9,037,450 B2 * | 5/2015 | Vukosavljevic | G06F 17/211 704/2 |
| 9,239,833 B2 * | 1/2016 | Cuthbert | G06F 17/289 |
| D749,115 S * | 2/2016 | Rogowski | D14/486 |
| 9,298,704 B2 | 3/2016 | Boyd | |

(Continued)

FOREIGN PATENT DOCUMENTS

EP 0398477 B1 9/1996

OTHER PUBLICATIONS

Talmud Bavli Tractate Arachin, p. 19a, published by Mesorah Publications Aug. 2011.

(Continued)

*Primary Examiner* — Lamont M Spooner
(74) *Attorney, Agent, or Firm* — Mark S. Cohen; Pearl Cohen Zedek Latzer Baratz LLP

(57) ABSTRACT

A rendering engine and method for a displaying foreign-text string and its translation in a single, composite-text string so as to reduce eye fatigue and thought interruption associated with eye shift between typical display schemes in which the foreign-text string and its translation are each presented in different fields of vision.

20 Claims, 10 Drawing Sheets

(56) References Cited

U.S. PATENT DOCUMENTS

| | | | | |
|---|---|---|---|---|
| 9,384,180 | B2* | 7/2016 | Piratla | G06F 17/248 |
| 9,398,210 | B2* | 7/2016 | Stach | G06T 1/0021 |
| 9,570,050 | B2 | 2/2017 | Duneau | |
| 9,653,000 | B2* | 5/2017 | Wee | G09B 19/06 |
| 9,690,782 | B2* | 6/2017 | Vukosavljevic | G06F 17/211 |
| 9,734,132 | B1* | 8/2017 | Kothandapani Shanmugasundaram | G06F 17/30905 |
| 9,773,197 | B2* | 9/2017 | Englund | G06F 17/289 |
| 9,778,811 | B2* | 10/2017 | Lee | G06F 9/454 |
| 9,916,305 | B1* | 3/2018 | Ayan | G06F 17/2836 |
| 2003/0040899 | A1* | 2/2003 | Ogilvie | G06F 17/289 704/2 |
| 2003/0179110 | A1 | 9/2003 | Abir | |
| 2003/0200078 | A1* | 10/2003 | Luo | G06F 17/2863 704/2 |
| 2008/0082317 | A1* | 4/2008 | Rosart | G06F 17/211 704/8 |
| 2008/0178081 | A1* | 7/2008 | Reshef | G06F 9/453 715/700 |
| 2008/0233980 | A1* | 9/2008 | Englund | G06F 17/289 455/466 |
| 2009/0157381 | A1* | 6/2009 | Furuuchi | G06F 17/289 704/7 |
| 2011/0090253 | A1* | 4/2011 | Good | G06F 17/289 345/633 |
| 2011/0097693 | A1* | 4/2011 | Crawford | G09B 5/065 434/157 |
| 2011/0231181 | A1* | 9/2011 | Furuuchi | G06F 17/289 704/7 |
| 2012/0116750 | A1* | 5/2012 | Onishi | G06F 17/289 704/3 |
| 2012/0163668 | A1* | 6/2012 | Englund | G06F 17/289 382/103 |
| 2012/0245922 | A1 | 9/2012 | Kozlova et al. | |
| 2013/0066623 | A1* | 3/2013 | Chou | G06F 17/289 704/2 |
| 2014/0172408 | A1* | 6/2014 | Vukosavljevic | G06F 17/211 704/2 |
| 2014/0215330 | A1* | 7/2014 | Lee | G09B 29/007 715/703 |
| 2015/0134318 | A1* | 5/2015 | Cuthbert | G06F 17/289 704/2 |
| 2015/0134323 | A1* | 5/2015 | Cuthbert | G06F 17/289 704/3 |
| 2015/0234812 | A1* | 8/2015 | Vukosavljevic | G06F 17/289 704/2 |
| 2017/0090693 | A1* | 3/2017 | Ku | G06F 3/04817 |
| 2017/0255614 | A1* | 9/2017 | Vukosavljevic | G06F 17/211 |

OTHER PUBLICATIONS

The Metsudah Chumash, Book of Bereishis (Genesis), p. 172, published by Metsuda Publications 1993.

The Chapter of 'Manna', an Art Scroll publication 2009; Internet access at: https://artscroll.files.wordpress.com/2009/01/the-chapter-of-manna.pdf.

The Chapter of the Offerings, a Heicha Rashbi publication; p. 46, 4 Shila Street, Jerusalem, Israel.

Shiviti Poster Art, Yosef Halevi, Internet access at: https:/www.antiques.co.uk/antique/Collection-3-Shiviti-old-Jerusalemites.

Cover page graphic, Book of Family Zemiros with translation and introduction, Rabbi Nosson Scherman, published by Mesorah Publications, Ltd., 1993, 1969 Coney Island Ave, Brooklyn N.Y. 11223.

"Length and Depth" display sample,Creative BLOQ, Internet access at: https://www.creativebloq.com/advice/use-spacing-effectively-in-typography.

* cited by examiner

At the door of the tent.¹⁰ מִפֶּ֣תַח הָאֹ֔הֶל
To see if there are any passers by לִרְא֕וֹת אִם־יֵ֥שׁ עוֹבְרִ֖ים
that he might invite into his home.¹¹ וִיכַנְסֵ֥ם לְבֵיתֽוֹ׃

FIG. 1A
(Prior Art)

וַיִּקְרָ֥א מֹשֶׁ֛ה לְהוֹשֵׁ֥עַ בִּן־נ֖וּן יְהוֹשֻֽׁעַ׃ ‹‹ *Joshua.* ‹ of Nun ‹ son ‹ Hoshea ‹ Moses called ‹‹ the Land, ‹ to investigate

FIG. 1B
(Prior Art)

לֹא הִצְרִיכוּ לִבְדּוֹק אֶלָּא בְּמָקוֹם — [This ruling] is necessary only for a place where some [merchants] weigh the pitch that they sell, while some measure their pitch by volume. קָא סַלְקָא דַּעְתָּךְ אֲמִינָא כּוּלֵּי — In such a case you might have thought that since just some, but not all [the merchants] weigh pitch, pitch,

FIG. 1C
(Prior Art)

Framing Character Configurations

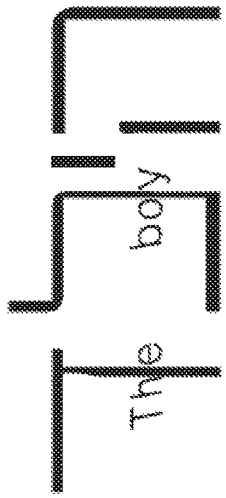 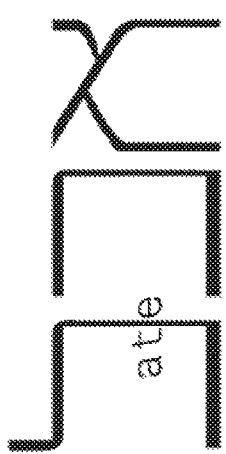
44 Composite text string with italicized centered translation
FIG. 8A
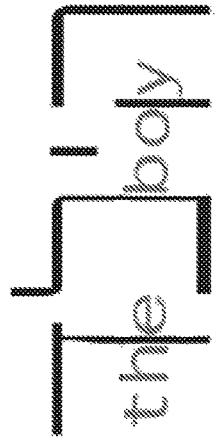 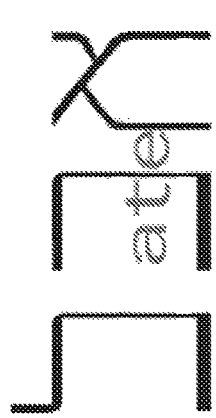
45 Composite text string with colored centered translation
FIG. 8B
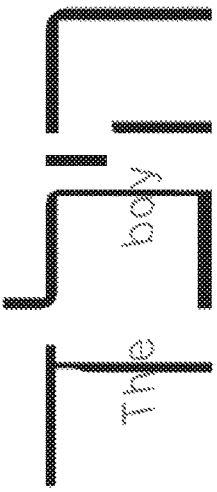 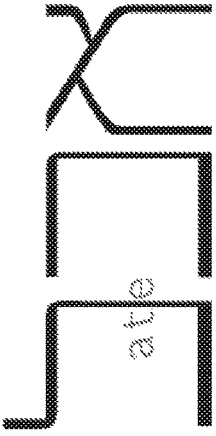
46 Composite text string with colored and italicized centered translation
FIG. 8C

SINGLE-LINE DISPLAY OF COMPOSITE-TEXT

BACKGROUND OF THE INVENTION

The present invention relates generally to rendering engines operative to display text, and specifically, to displaying foreign-language text and its translation content in a manner reducing eye fatigue generated from eye shift when displayed in separate text strings. Typically, in the context of translation engines, translation text is disposed either to the side or underneath a target foreign-language text. During extended reading, the necessary ongoing eye shift fatigues the reader. Examples of linear translations in which the translation is disposed underneath the target text are provided in U.S. Pat. No. 6,778,950 and US publication 2011/0097693.

US publication 2008/0233980 teaches a system providing an English translation overlaying a foreign text that eliminates the need for eye shift. However, the English overlay obscures significant portions of the foreign text thereby making it difficult for one learning the foreign language to associate the translation with the now obscured, unfamiliar foreign text.

Therefore, there is need for a rendering engine operative to display unobscured foreign-language text and its translation in a minimizing eye fatigue.

SUMMARY OF THE INVENTION

According to the teachings of the present invention there is provided a method for displaying translation content of a translation engine performed on a computer having a processor, memory, and one or more code sets stored in the memory and executed in the processor, the method including: obtaining a foreign-language text (FLT); obtaining a translation text of the FLT, the translation text formed by translation characters; rendering the FLT into foreign-language (FL), framing characters, each of a plurality of the framing characters having a geometry defining a counter width; designating a horizontal series of points in a display space defining placement of a series of receiving regions, the receiving regions having a width substantially equal to the counter width or a fraction thereof; placing one translation character of the translation characters in each of two, adjoining receiving regions of the receiving regions, wherein an advance width of each of the one translation characters is substantially equal to a width of its respective receiving region of the adjoining receiving regions, wherein each of the adjoining receiving regions is disposed within two adjacent FL framing characters of the framing characters, wherein each of the two adjacent FL framing character encloses its respective translation character on at least two sides; and displaying a composite text having the translation text disposed within the foreign-language text.

According to a further feature of the present invention, the obtaining a foreign-language text is derived from voice recording or image capture.

According to a further feature of the present invention, the counter width is identical for a plurality of the framing characters.

According to a further feature of the present invention, each of a plurality of the framing characters having a character geometry defining a counter includes two vertical strokes devoid of a traversing stroke in between them obstructing viewing of the one translation character.

According to a further feature of the present invention, the translation characters are displayed in a color or a weight different from that of the first FL framing character.

According to a further feature of the present invention, the translation characters are displayed in a treatment different than that of the first FL framing character.

According to a further feature of the present invention, the displaying a composite text having the translation text is implemented is accordance with a pre-defined time period.

According to a further feature of the present invention, one of the receiving regions is filled with a vertical stroke of a framing character, the vertical stroke having a width substantially equal to a receiving region.

There is also provided according to the teachings of the present invention, a method for displaying translation content of a translation engine performed on a computer having a processor, memory, and one or more code sets stored in the memory and executed in the processor, the method including: obtaining a foreign-language text (FLT), the FLT having foreign-language characters; obtaining a translation of the FLT; rendering the translation into translation, framing characters, each of a plurality of the framing characters having a geometry defining a counter width; designating a horizontal series of points in a display space defining placement of a series of receiving regions, the receiving regions having a width substantially equal to the counter width or a fraction thereof; placing one of the foreign-language characters of the foreign-language characters in each of two, adjoining receiving regions of the receiving regions, wherein an advance width of each one of the foreign-language characters is substantially equal to a width of its respective receiving region of the adjoining receiving regions, wherein each of the adjoining receiving regions is disposed within two adjacent translation framing characters of the framing characters, wherein each of the two adjacent translation framing character encloses its respective FLT character on at least two sides; and displaying a composite text having the foreign-language text disposed within the translation text.

According to a further feature of the present invention, the obtaining a foreign-language text is derived from voice recording or image capture.

According to a further feature of the present invention, the counter width is identical for a plurality of the framing characters.

According to a further feature of the present invention, each of a plurality of the framing characters having a character geometry defining a counter includes two vertical strokes devoid of a traversing stroke in between them obstructing viewing of the one translation character.

According to a further feature of the present invention, one of the receiving regions is filled with a vertical stroke of a framing character, the vertical stroke having a width substantially equal to a receiving region.

There is also provided according to the teachings of the present invention, a rendering engine with composite-text display functionality, the engine including: an input device configured to capture foreign-language content; a processor operative to: render the foreign-language content into textual, foreign-language (FL) framing characters, each of a plurality of the framing characters having a geometry defining a counter width; obtain a translation text of the foreign-language text, the translation text formed by translation characters designate a horizontal series of points in a display space defining placement of a series of receiving regions, the receiving regions having a width substantially equal to the counter width or a fraction thereof; place one translation character of the translation characters in each of two, adjoining receiving regions of the receiving regions, wherein an advance width of each of the one of the translation characters is substantially equal to a width of its respective receiving region of the adjoining receiving regions, wherein each of the adjoining receiving regions is disposed within two adjacent FL framing characters of the framing characters, wherein each of the two adjacent FL framing character encloses its respective translation character on at least two sides; and an output device configured to display a composite text of the translation text disposed within the foreign-language text.

According to a further feature of the present invention, the input device is implemented as a microphone or a camera.

According to a further feature of the present invention, the output device is implemented as a printer or a display screen.

According to a further feature of the present invention, the display screen configured to display the translation text for a predefined time period.

There is also provided according to the teachings of the present invention, a rendering engine with composite-text display functionality, the engine including: an input device configured to capture foreign-language content; a processor operative to: render the foreign-language content into textual, foreign-language (FL) framing characters, each of a plurality of the framing characters having a geometry defining a counter width; obtain a translation text of the foreign-language text, the translation text formed by translation characters; designate a horizontal series of points in a display space defining placement of a series of receiving regions, the receiving regions having a width substantially equal to the counter width or a fraction thereof; place one foreign-language characters of the foreign-language characters in each of two, adjoining receiving regions of the receiving regions, wherein an advance width of each of the one of foreign-language characters is substantially equal to a width of its respective receiving region of the adjoining receiving regions, wherein each of the adjoining receiving regions is disposed within two adjacent translation framing characters of the framing characters, wherein each of the two adjacent translation character encloses its respective FLT character on at least two sides; and an output device configured to display a composite text of the translation text disposed within the foreign-language text.

According to a further feature of the present invention, the output device is implemented as a display screen.

According to a further feature of the present invention, the display screen is configured to display the translation framing characters until receipt of a user input.

BRIEF DESCRIPTION OF THE DRAWINGS

The subject matter regarded as the invention is particularly pointed out and distinctly claimed in the concluding portion of the specification. Invention components, features, their interaction, operation, and advantages are best understood with reference to the following detailed description and accompanying drawings in which:

FIGS. 1A-IC are various sample of prior art requiring constant eye shift between a foreign-language text and a translation disposed either to the side, underneath, or both;

FIGS. 8A-8C depict composite text renderings of FIG. 7B in which the center characters are displayed with color and treatment variations, according to an embodiment;

Figure 2:
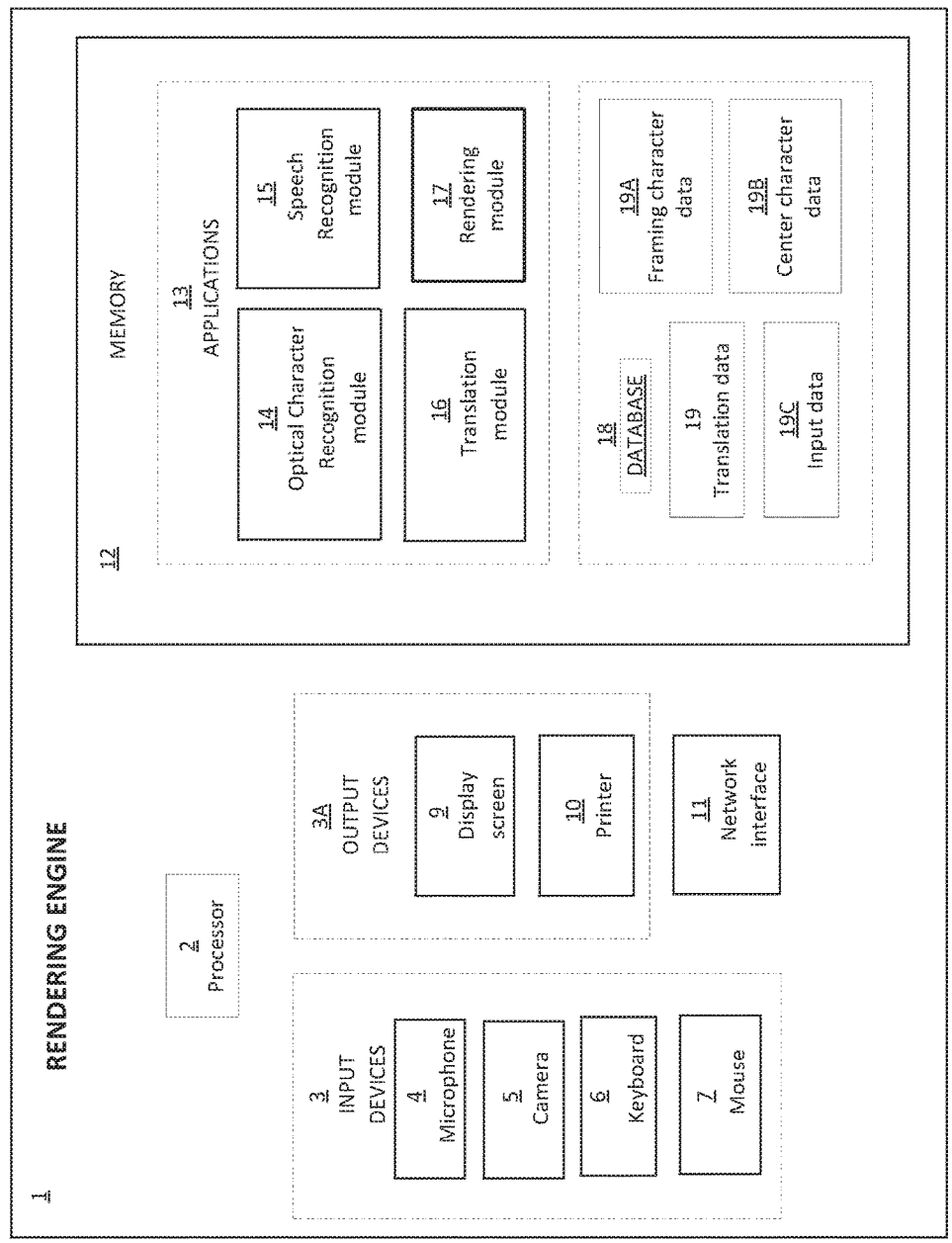
FIG. 2 is a schematic block diagram of a rendering engine, according to an embodiment.

It will be appreciated that for simplicity and clarity of illustration, elements shown in the figures are not necessarily drawn to scale and reference numerals may be repeated among figures to indicate corresponding or analogous elements.

DETAILED DESCRIPTION OF THE PRESENT INVENTION

The following description sets forth various details to provide a thorough understanding of the invention and it should be appreciated, by those skilled in the art, that the present invention may be practiced without these specific details. Furthermore, well-known methods, procedures, and components have been omitted to highlight the present invention.

As noted, the current invention is a rendering engine directed to displaying a foreign-language text and its translation as composite-text string disposed in a single text line with the characters of each language interspersed within each other in a manner complying with readability and legibility requirements.

Following are terms to be used throughout this document:

"Input text" or "input language" refers to a foreign-language text in accordance with language configurations. Text refers to words and not acronyms, in a certain embodiment.

"Translation text or translation language" refers to the translation. Without diminishing in scope, non-English is considered the foreign language and English is considered the translation language for the purposes of this document.

It should be appreciated that a language is deemed foreign-text entirely on the basis of user preference and the present rendering engine provides user configurability to enable users to define the language to be treated as foreign language and the language to be treated as a translation language.

"Typeface and "character" refer to the actual letter body.

A "font" is a typeface rendered in a treatment, weight, and size. For example, a "Times New Roman typeface rendered with italic treatment, bold weight, and 12pt size is a Times New Roman, italic bold 12pt" font. In addition to these font parameters, the font also includes a side bearing around the typeface set by the font designer. Font data includes this data for these parameters and spacing parameters.

"Framing character" refers to a character enclosing region of sufficient area to contain one or more receiving regions. Enclosing two or more complete sides is deemed to be enclosing.

"Counter" refers to an area enclosed on at least two sides by a framing character with area of sufficient size to enclose one or more receiving regions.

In a certain embodiment, the counter of each framing character is implemented with the same width. In another embodiment, the counter width of framing characters is word specific and can vary on a word by word basis.

"Center text" or "center characters" refers to characters disposed within receiving regions; either inside framing-character counters, in-between framing characters, or both inside and in-between framing characters simultaneously. Center characters shifted vertically or horizontally from the center of a receiving region is still deemed to be a center character if minimally enclosed by a framing character.

"Framing character spacing" refers to intra-word spacing between framing characters, in a certain embodiment. It is defined by one or more widths of the receiving regions in accordance with configuration preferences. For example, the spacing between framing letters is configurable as one, two, or three receiving regions In another embodiment, intra-word spacing is defined by unfilled receiving regions within counters of framing characters contacting each other.

Inter-word spacing of framing characters between words is greater than the intra-word spacing of framing characters, in accordance with configuration preferences. It should be noted that these are minimum inter-word spacing of framing characters. In certain situations when the number of center characters exceeds the number of receiving regions available within a framing word, the spacing between framing words will be increased by the number of receiving regions necessary to receive the center characters.

"Center character spacing" refers to the spacing between center characters within words and is defined by side bearings built into the font file of the center character by font designers, in a certain embodiment. The juxtaposition of side bearings of adjacent center characters provides natural spacing by aligning the advance width of the center characters with the points of division defining receiving region boundaries, as will be further discussed. In a certain embodiment, negative side bearings are employed to define spacing between center characters when the center characters are implemented as script.

In a certain embodiment, the center characters are glyph justified to achieve alignment of the advance width of center characters with demarcation points dividing a display space into receiving regions.

In a certain embodiment, the center characters are implemented kerning-modified side bearings define center character spacing within cell boundaries.

Turning now to the figures, FIGS. 1A-1C depict various types of prior art directed at providing a translation to a foreign-language text. As shown, in FIG. 1A the translation is presented as a separate text line disposed to the side of the foreign-language text whereas in FIG. 1B the translation is disposed underneath the foreign text, and in FIG. 1C the translation is presented both to the side and underneath of the foreign-language text. As previously noted, all of these display configurations whether displayed as virtual text on a display screen or as printed text all fatigue the reader because of required eye shift.

FIG. 2 is schematic block diagram of a translation rendering engine 1 configured to translate an input language into a more familiar translation language and display both texts in a single, composite text string.

In a certain embodiment, the rendering engine 1 includes at least one processor 2 and input devices 3 including a microphone 4 for speech capture, a camera 5 for visual text capture, a keyboard 6, and a mouse 7. Output devices 3A include a display screen 9 in any of the various forms associated with computing devices, and a printer 10. Engine 1 also includes a network interface 11 for network enablement. It should be appreciated that processing may be implemented either locally or remotely via various forms of wireless or wired networking technologies or a combination of both.

Memory 12 includes various types of short and long-term memory as is known in the art. Memory 12 is loaded with various applications or algorithms including optical character recognition module 14 for rendering captured text images into text, a speech recognition module 15 for rendering recorded speech into foreign-language text, a translation module 16 for identifying a translation best fitting the foreign-language text, and a text rendering module 17 for displaying a composite text of framing and center characters of a foreign-language and its translation in a single text string as will be further discussed. Memory 12 also includes a database 18 of translation content 19 servicing translation module 16, and framing character data 19A of framing characters having the required geometries enabling composite-text display as will be further discussed, and center-character data 19B to be employed when filling receiving regions, and input data 19C for storing text either derived from image or sound data or input directly. Engine 1 is operative to employ various font technologies like raster, vector, TrueType, and Microsoft OpenType and database 18 also includes associated font-resource files.

It should be appreciated that in a certain embodiment, translation module 16 is configurable to translate various foreign languages into either English or other chosen languages. Accordingly, database 18 includes all necessary content and in a certain embodiment is implemented locally whereas in another embodiment it is implemented remotely. It should be appreciated that pre-translated content is also stored with translation data and is employed when processing text in which pre-translated content is available, according to an embodiment.

FIGS. 3A-3D depict various, sample framing characters having a standardized typeface geometry forming a counter width equal to an integer multiple of receiving region widths, with an area within the counter devoid of a traversing stroke so as to enable and having height sufficient to receive receipt of ascenders or descenders of center characters within the receiving regions without contacting the framing characters, in a certain embodiment. It should be noted that the reference grid highlights a series of monospace demarcations in a display space defining placement of receiving regions and is shown as grid to highlight the basis of a spacing scheme; the grid is absent when the composite-text is displayed.

Figure 3A:
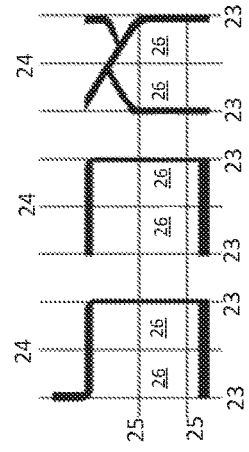
FIGS. 3A-3D are various samples of framing characters depicted in reference grids highlighting receiving regions disposed within counters of the framing characters, according to an embodiment.

Specifically, FIG. 3A depicts sample English framing characters in a reference grid highlighting two receiving regions 22 within the counter of each of the English framing characters. As shown, each of the two receiving regions 22 between reference lines 20 and counter median 21 have widths that are fractions of the counter width highlighted by reference lines 20. It should be appreciated that, generally, the cumulative width of receiving regions is substantially equal to the width of the counters of the framing characters.

Figure 3B:
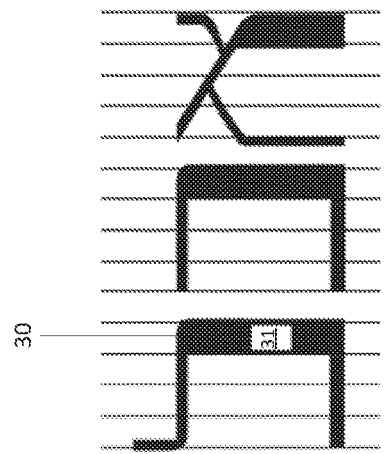

FIG. 3B depicts sample Hebrew framing characters in a reference grid highlighting two receiving regions 26 within each of the Hebrew framing characters. Here too, each of the two receiving regions 26, between reference lines 23 and counter median 24 have a width which is fraction of the counter width. Horizontal reference lines 25 depict a necessary geometry requirement of the framing character to provide sufficient height in the receiving region to receive a center character in the absence of contact between an ascender or descender with the framing letter.

Figure 3C:
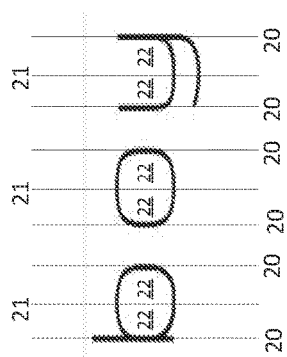

FIG. 3C depicts sample Hebrew framing characters in a reference grid analogous to the sample depicted in FIG. 3B. As shown, four receiving regions 26 collectively span the counter width highlighted by reference lines 27. Two of the four receiving regions 27 are disposed on each side of counter median 28. In this manner center characters populating receiving regions 27 are offset from the middle of counter of the framing counter. Here too, horizontal reference lines 29 depict a necessary geometry requirement of the framing character to provide sufficient height in the receiving region to receive a center character in the absence of contact between an ascender or descender with the framing letter.

Figure 3D:
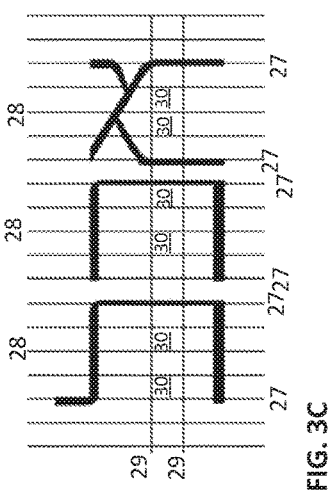

FIG. 3D depicts Hebrew framing characters in a reference grid analogous to the sample depicted in FIG. 3C in which a vertical stroke 30 of the framing has a width substantially equal to the width of any of the three receiving regions whose collective widths span the counter. Vertical stroke 30 includes a window 31 for receipt of a center character to be read together with center characters disposed in other receiving regions. As shown, a portion of the framing letter overlaps side bearings of the center character as will be further discussed.

It should be appreciated that the width of the receiving region also defines the spacing between the framing characters, in a certain embodiment. Alignment between framing and center characters is achieved through the depicted virtual grid highlighting demarcations defining positioning of the receiving regions and framing characters, according to an embodiment. Furthermore, in a certain embodiment, the width of the receiving regions is set by a user or font designer. In another embodiment, the width of the receiving regions is configurable as a fraction of the width of a given framing-character counter. Additionally, it should be appreciated that in a certain embodiment the framing characters are implemented with broken or dashed lines.

Figure 4A:
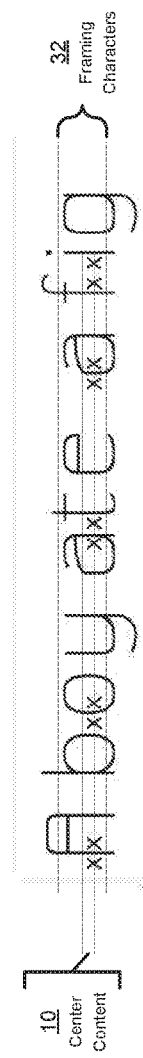
FIGS. 4A-4B depict various, horizontal placement options of center content within English translation-framing characters, according to an embodiment.
Figure 4B:
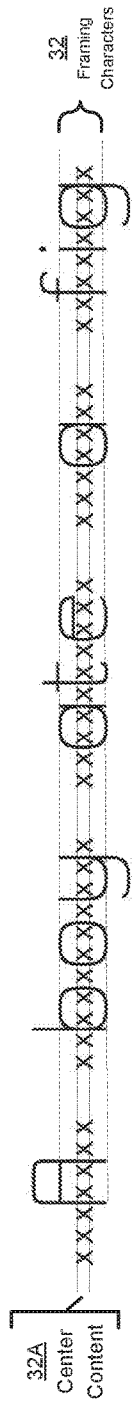

FIGS. 4A-4B depict a framing text of English language, Latin framing characters 32 in which a few of the available receiving regions have been populated with center content 32A. Center content 32A is depicted in general terms to highlight the fact that it can be implemented in various foreign languages to the word or the phrase within which it is framed, in accordance with the embodiment. In a certain embodiment, center content 32A is implemented as a translation of the word or phrase associated with the framing characters 32. In another embodiment, center content 32A is implemented as an ideograph or pictogram. In another embodiment, center content 32A is implemented as a picture, whereas in another embodiment it is implemented as an instruction or commentary. In another embodiment, a combination of these content types is employed as a content type mix. This document is directed to the translation of a foreign language text.

As shown in FIG. 4A, some of the receiving regions bound by an element of the framing character are filled and other receiving regions are unfilled. This illustrates a certain configuration employing a fill order in which the receiving regions bound by a framing character are filled prior to other receiving regions.

Figure 6:
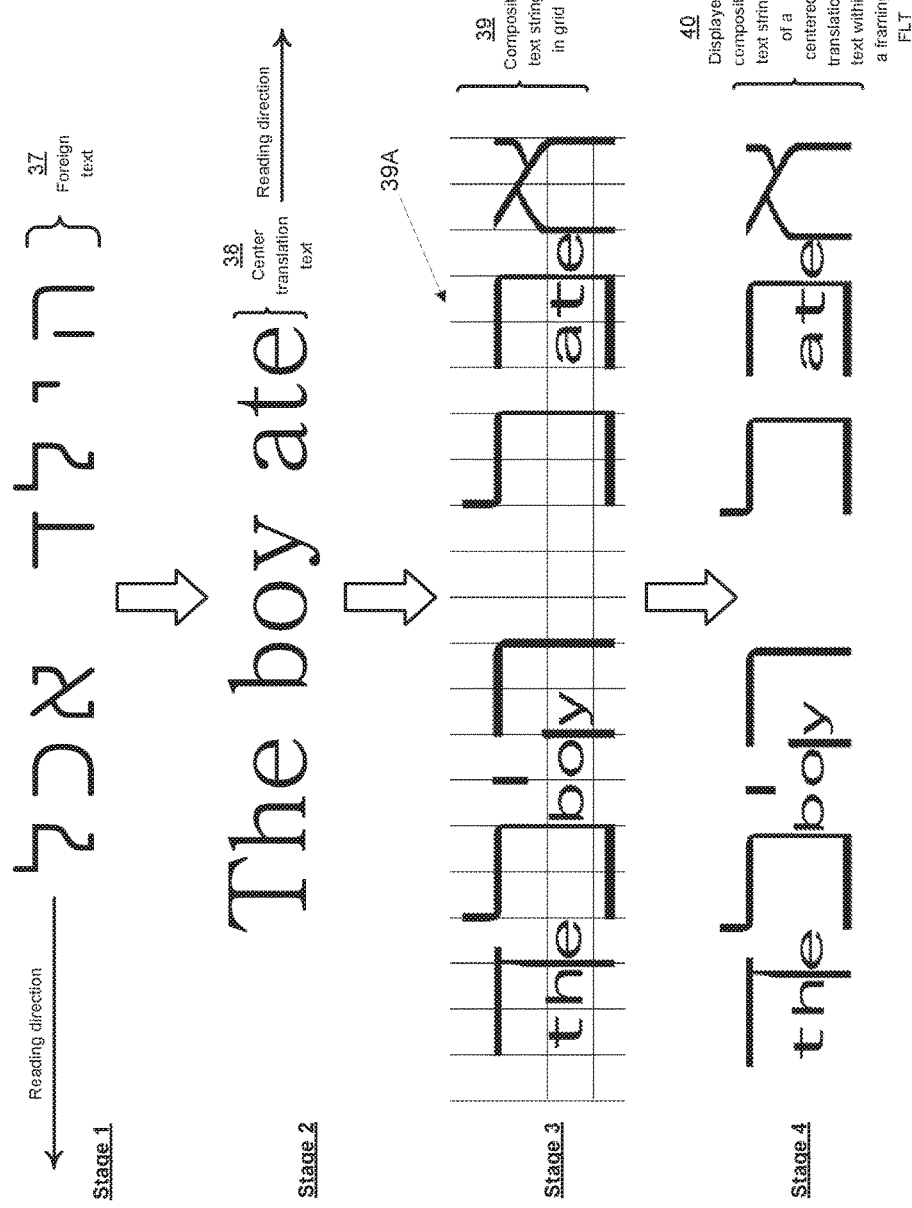
FIG. 6 depicts rendering stages of a sample English translation characters disposed in associated Hebrew framing characters into a composite text string, according to an embodiment.

Accordingly, when the framing character is English, read from left to right, the fill order first populates the receiving regions bound by the left element of the framing character as shown in charters "A", "o" and "a". When the framing characters are Hebrew, read from right to left, the receiving regions bound by the right side of the Hebrew framing letter are filled first, as shown in FIG. 6, stage 3, in the word furthermost to the right.

In terms of word placement of the center text within the framing characters, in a default configuration the fill order is operative to center the embedded text in the middle of the framing word as shown in the word "boy", in a certain embodiment. It should be noted, that the horizontal centering of words formed from centering characters within the associated framing words is a configurable feature, in a certain embodiment.

FIG. 4B depicts a composite-text display in which the center content exceeds the length of the associated word expressed in the framing characters. In such instances, rendering engine 1 is configured to provide as many additional, empty receiving regions between framing words to ensure that translation content is placed within the appropriate framing word or phrase, according to an embodiment.

In another embodiment, engine 1 is configured to reduce the width of the receiving regions responsively to threshold deviation between the number of receiving regions required to contain all center characters associated with the framing characters. This configuration advantageously reduces the number of center characters between words formed by framing characters.

Figure 4C:
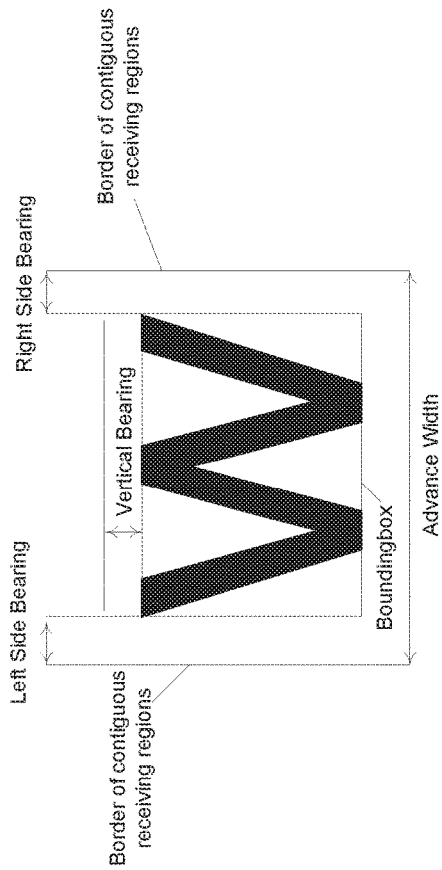
FIG. 4C depicts a center character and its side bearings between the character and the boundaries of the receiving region within which the character is disposed; according to an embodiment. Accordingly, adjacent side bearings of contiguous receiving regions define spacing between center characters. It should be appreciated that the cumulative space of the two side bearings is reduced by overlay of a framing character disposed in between the two receiving regions as will be further discussed.

FIG. 4C depicts a typeface and its associated side bearings and cumulative advance width of the side bearings and typeface. As shown, the side bearings are measured from the outer extremities of the typeface as highlighted with the boundingbox. The side bearings embody the ideal spacing between characters providing legibility in which the characters are minimally spaced to facilitate discerning of each separate character and readability in which the characters don't exceed a maximin spacing to facilitate mental association between characters. These minimum and maximum spacing thresholds between center characters are set by the font designer. The instant rendering engine advantageously leverages the side bearing by filling the entire width of a receiving region with the advance width of a center character so that adjacent side bearings set center-character spacing for a legible and readable center text within the framing text, according to an embodiment.

It should be noted that in certain fonts, like scripts for example, the character spacing is set by a negative side bearing as is known to those skilled in the art. That means that the spacing between center characters is not measured from the outermost extremity of the center character, but rather, from the inner boundary of the negative side bearing.

It should be appreciated that in certain embodiment a portion of a side bearing bordering a framing character can be partially overlaid by a portion of a framing character.

Figure 5:
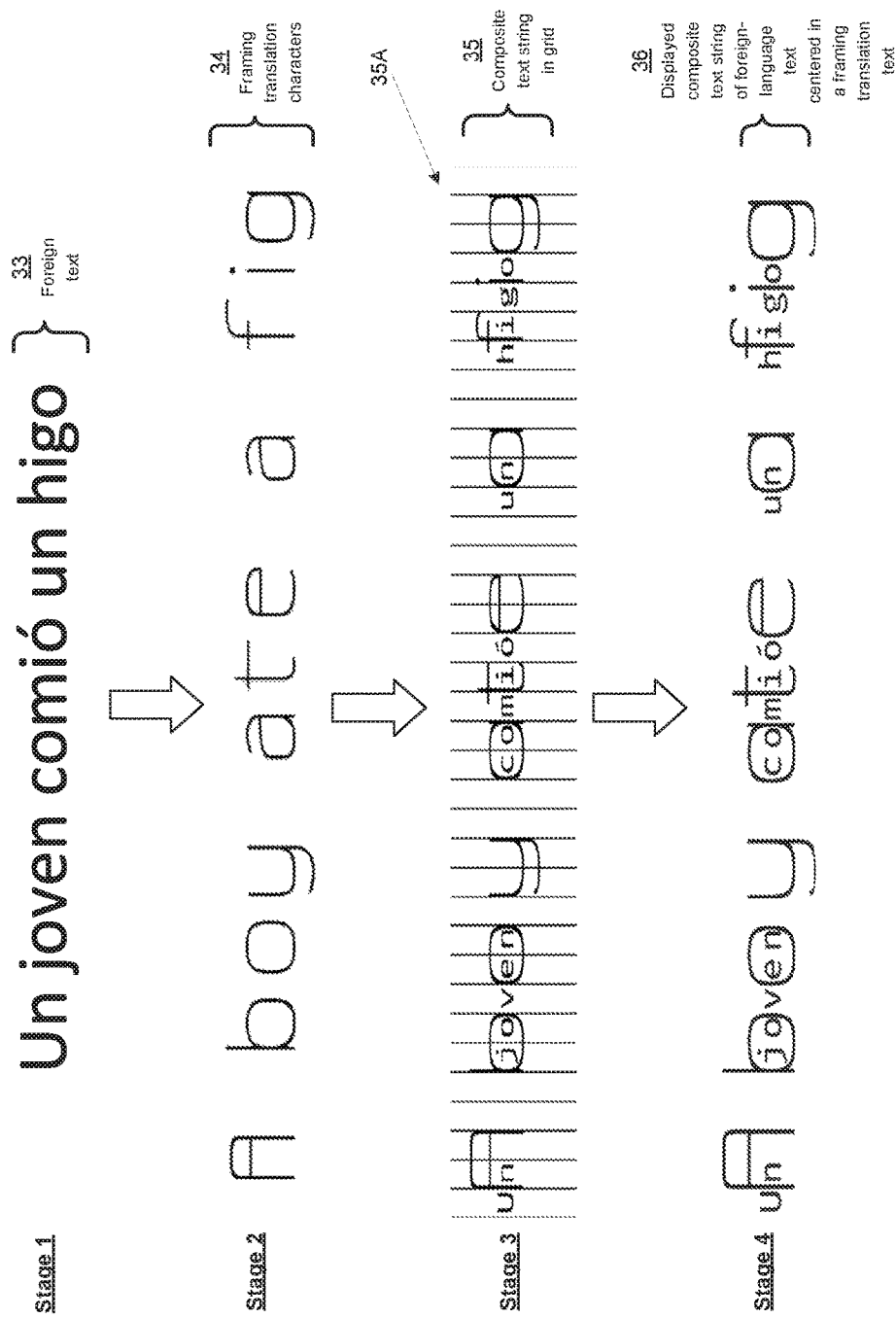
FIG. 5 depicts various rendering stages of a sample Spanish foreign-language text and English framing characters into a composite text string, according to an embodiment.

FIG. 5 is a depiction of rendering stages involved in the display of a foreign-language text and its translation into a single composite text, according to an embodiment.

Specifically, in this example, Stage 1 depicts Spanish text 33 received by rendering engine 1 (Shown in FIG. 2) and stage 2 depicts English translation 34 is identified. In this configuration, Spanish characters 33 are treated as center characters and English characters as framing characters. Stage 3 depicts Spanish characters 34 populating the appropriate translation framing letters 34 associated with the English translation in accordance with demarcated receiving regions highlighted here with reference grid 35A. Stage 4 depicts, the display of a grid-free, composite text string of the Spanish text enclosed by its English translation as a readable foreign text and translation that can be read in the absence of tiring eye shift associated with typical translations offset from their foreign-language text.

FIG. 6 is also a depiction of rendering stages involved in the display of a foreign-language text and its translation into a single composite text. In the depicted example, Hebrew foreign-language text 37 is treated as the framing text and English translation text is treated as the center text. It should be noted that engine 1 is operative to handle languages read in opposite directions as depicted in this example Specifically, in this example, stage 1 depicts a sample Hebrew text 37 received by rendering engine 1 (Shown in FIG. 2.) and stage 2 depicts an English translation 38 identified. Stage 3 depicts Hebrew characters 37 populated with the appropriate English translation characters 38 in accordance with demarcated receiving regions highlighted here with the reference grid 39A. Stage 4 depicts a grid-free composite text string 40 of Hebrew text enclosing English translation characters 38 at a character spacing in approximation with readability standards for both the framing and center text strings to greatly reduce, if not to entirely eliminate, tiring eye shift associated with typical translations offset from the foreign text.

The noted standardized geometry of the framing characters together with the standardized receiving regions advantageously enable an interchangeability of characters of various writing systems while preserving legibility and readability requirements.

It should be appreciated that in any alphabet there are framing characters like "t", "f", and "i" may not be conducive to sufficiently enclosing a region to form counter, in accordance with typographer design. Such letters are deemed to be counter-free framing characters and adjacent, receiving regions are populated in accordance with translation needs. Framing characters possessing a typeface geometry enclosing two or more complete sides of a receiving region are deemed to have a counter, according to an embodiment. Broken or dashed strokes are treated as solid strokes for the purposes of this document.

Figure 7A:
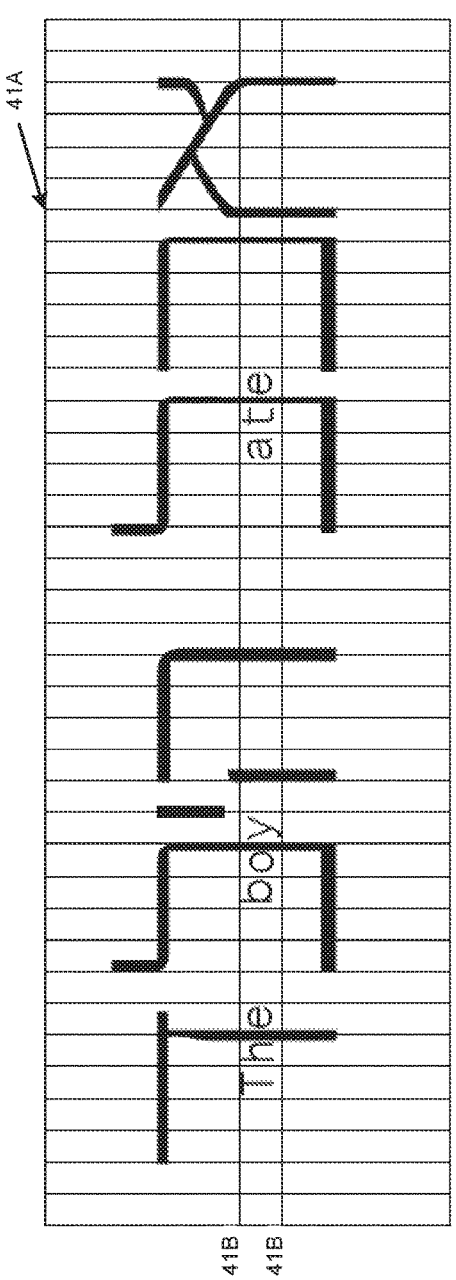
FIGS. 7A-7B depict an alternative, configuration option of FIG. 5 in which counters of the Hebrew framing characters are partitioned into four receiving regions, shown within a reference grid and in the absence of the reference grid, respectively, according to an embodiment.
Figure 7B:
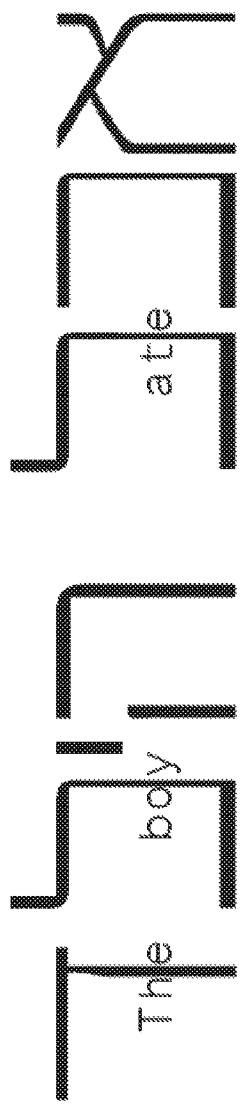

FIGS. 7A-7B depict an alternative configuration of that depicted in FIG. 6 with the reference grid and the final display form without the grid, respectively Specifically, the counter width of the Hebrew framing characters has been divided into four receiving regions as depicted by reference grid 41A. As noted above, the number of receiving regions for a counter of a framing character is an integral multiple equal to or greater than, one. Horizontal markers 41B depict the required height of the receiving regions that must be accommodated by the framing characters to avoid intersect between ascenders and descenders of center characters with the framing characters, according to an embodiment. In another embodiment, center and framing characters contact each other without overlapping.

FIGS. 8A-8C depict variant configurations of that depicted in FIG. 6 in which the center characters are implemented with various, user-selected font parameters.

Specifically, FIG. 8A depicts center characters implemented with an italicized treatment, FIG. 8B depicts center characters implemented with a color differing from that of the framing characters, and FIG. 8C depicts center characters implemented with both italicized treatment and a variant color. It should be appreciated that a wide variety of color, weights, treatments, sizes, and their combination are user-configurable. Analogously, user configuration capabilities also exist for framing characters, according to an embodiment.

It should be appreciated that in a certain embodiment center and framing characters are slanted in their reading direction when they have opposite reading directions. In another variant embodiment, both center and framing characters are slanted in the same direction.

Figures 9A, 9B:
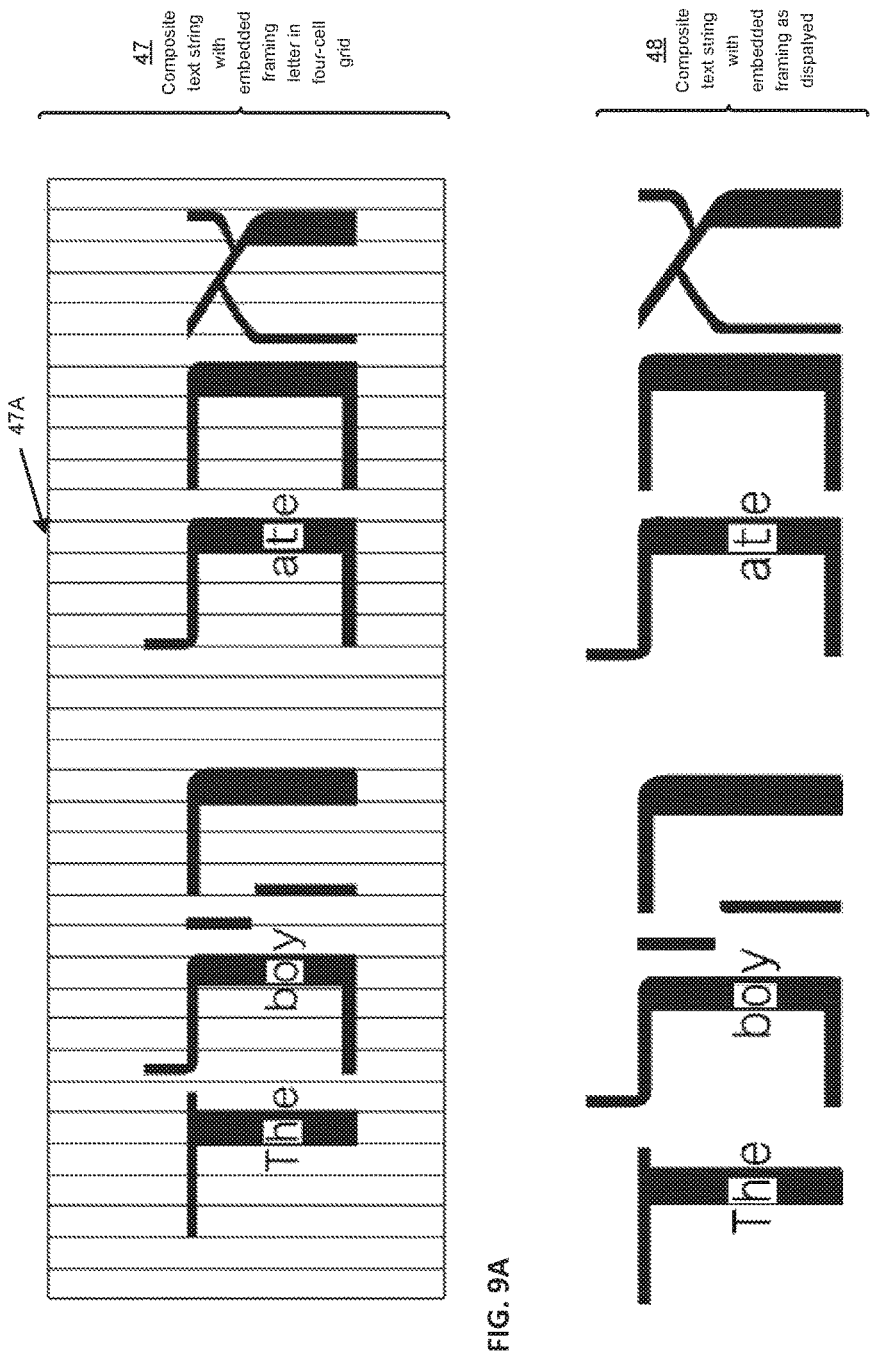
FIGS. 9A-9B depict a gridded and non-gridded stages, respectively, of an alternative embodiment of the composite text of FIG. 8B in which center characters are disposed in the body of framing characters, according to an embodiment.

FIGS. 9A-9B depict a variant configuration of that depicted in FIGS. 8A-8B. As shown in FIG. 9A, the framing counter contains three receiving regions, as highlighted with reference grid 47A, within framing characters having a widened vertical stoke equal in width to a receiving region width. A receiving window is disposed within each of the widened vertical strokes for receipt of a center character while all other framing-character geometry requirements are preserved. A portion of the framing character overlays the side bearings of the center characters whose advance width, spanning the stroke width, is effectively diminished by the partial overlay of the framing character. In another configuration, the advance width spans the entirety of the vertical stroke with no framing character overlap of the side bearings and it should be appreciated that the degree of overlay of the side bearings defines the degree of empty space visible within the vertical stroke.

FIG. 9B depicts the final, grid-free display version of FIG. 9A.

Figure 10:
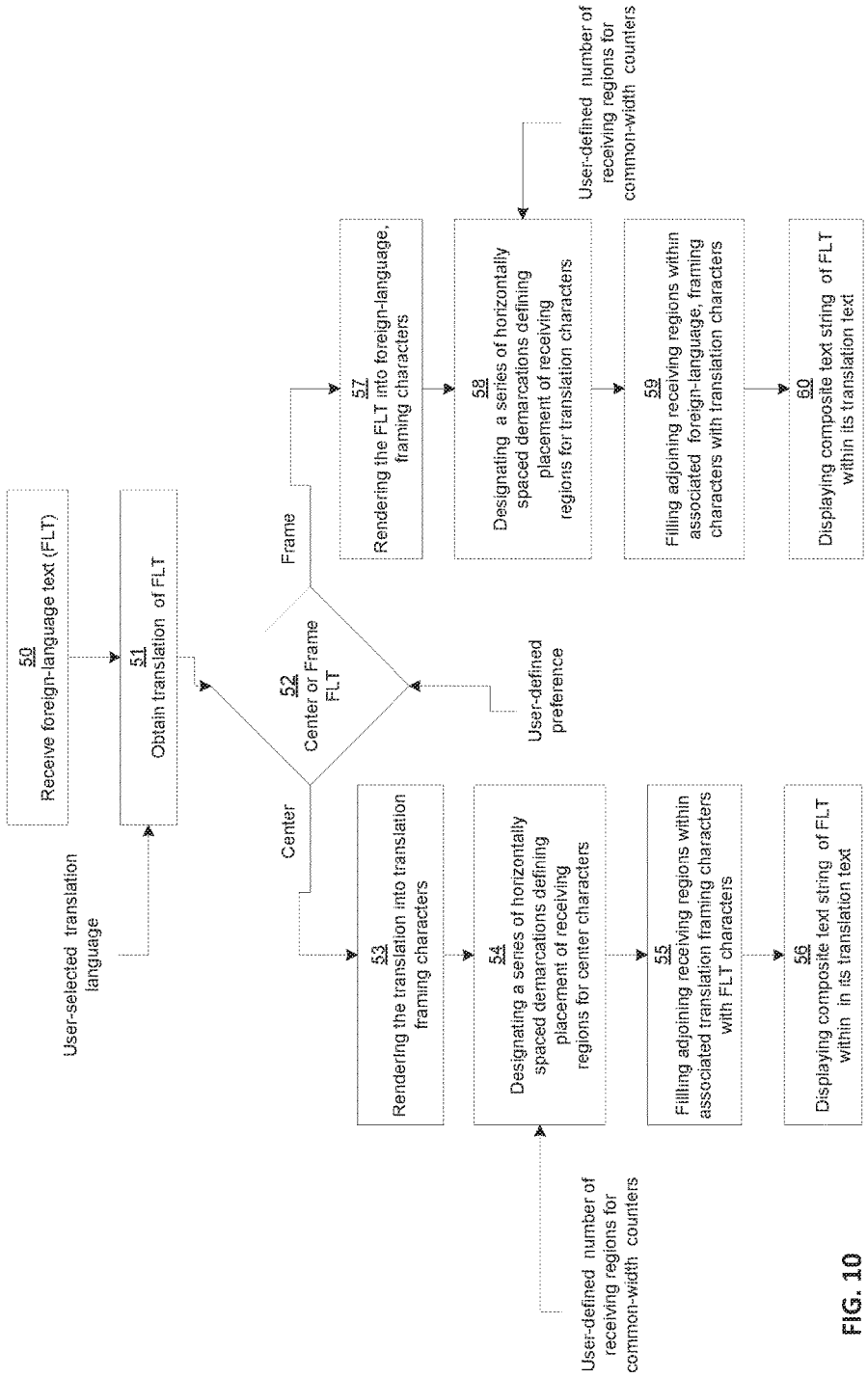
FIG. 10 is a schematic flow chart depicting process flow steps of the rending engine of FIG. 2, according to an embodiment.

FIG. 10 depicts a flow chart of steps employed by rendering engine 1 of FIG. 2, according to an embodiment. The following steps should be read in view of FIG. 2.

As shown in step 50, a Foreign-Language Text (FLT) is received either directly through keyboard 6, from speech recognition module 15 after conversion of speech captured through microphone 4, or from optical character recognition module 14 after conversion from an image captured by camera 5, in accordance with embodiment. In a certain embodiment a user-configured combination of text input methods is employed.

In step 51, a translation of the FLT is obtained through translation module 16; the translation language defined by the user. As noted above, translation module 16 is configurable to generate a translation in real time or utilize an existing translation produced by an outside party.

In step 52, a configuration option is implemented on the basis of user preference setting forth the FLT as either a center text or as a framing text.

When the FLT is implemented as center characters, processing continues to step 53 where the identified translation text is rendered into translation framing characters stored as framing character data 19A of database 18. As noted above, framing characters have standardized geometries defining counters with sufficient width and height to accommodate center characters without contacting framing characters.

In step 54, a series of horizontally spaced demarcations of a display space are designated. These demarcations define placement of receiving regions that can potentially receive a foreign-text character as a center character.

In a certain embodiment, the width of the center characters is pre-defined by a user and the framing characters are designed to enclose a desired number of center characters such that the counter width of the framing character is substantially equal to the cumulative width of the receiving regions.

In an alternative embodiment, the framing characters are pre-designed and the number of receiving regions to be enclosed by framing character counters is selected by a user in accordance with the preferred number of center characters desirable to be displayed within a counter.

In a certain embodiment the width of the receiving region also defines the spacing between framing characters, and the spacing between framing words as multiples of the receiving region widths. In another embodiment, unfilled receiving regions enclosed by framing character counters provide spacing between center characters. It should be appreciated that in a certain embodiment, counter widths may vary for different words formed by framing characters whereas in another embodiment, the width of framing counters is substantially identical across all words formed by framing characters.

In step 55, the identified receiving regions are filled with foreign-language characters and their associated side bearings in accordance with a chosen fill order. In a certain configuration, glyph justification is employed. In a certain configuration kerning is applied in accordance with spacing restrictions set by the receiving region boundaries. It should be appreciated that upon filing the designated receiving regions an FLT character is disposed either within a translation framing character, or in-between a framing character, or both inside and in-between framing characters. In this regard, the terms "within" refers to both enclosed, sandwiched, or both enclosed and sandwiched.

In step 56, a composite string of the FLT framed in the characters of the translation text is displayed either on display screen 9, printer 10, or both.

When the FLT is implemented as framing characters, processing continues to step 57 where the foreign-language text is rendered into foreign-language framing characters stored as framing character data 19A of database 18. As noted above, framing characters have geometries defining common-width counters with sufficient width and height to accommodate center characters without contacting framing characters, in a certain embodiment.

Processing steps 58-60 are analogous to step 54-56 so the following steps will be set forth with the understanding that features noted in steps 54-56 apply as appropriate for steps 58-60. In step 58, here too a user-defined number of receiving regions is identified for receipt of translation center characters.

In step 59, the identified receiving regions are filled with translation characters and their associated side bearings in accordance with a fill order priority such that the translation characters are both enclosed and sandwiched between framing characters. In certain embodiments, both enclosure and sandwiching is achieved on the same center characters.

In step 60, a composite string of FLT framing characters framing characters defining the translation of the FLT is displayed either on display screen 9, printer 10, or both.

It should be appreciated that the center and framing characters are displayed in accordance with the above-noted user selected font parameters, like color, treatment, font size.

Furthermore, in a certain embodiment employing a display screen, the translation characters are displayed momentarily or for a user-defined time-period like 2 seconds, 5 seconds, 10 seconds, 30 seconds, or even 60 seconds. In another embodiment, the translation characters are displayed responsively to user input. In this embodiment also, the display time is configurable. Analogously, in another embodiment, the translation characters are displayed automatically until receipt of a user input terminating their display.

User input is implemented either though a touch screen or through verbal instruction.

As noted, the composite text string advantageously reduces eye fatigue by providing both input and translation texts in single field of vision thereby enabling simultaneous viewing between typically separated foreign text and translation strings. This field of vision is referred to as a single-line display and spans the area bound by the vertical extremities of the framing characters. Furthermore, thought interruptions resulting such eye shifts are also reduced if not entirely eliminated Accordingly, this display configuration also facilitates learning of foreign languages.

In a certain embodiment, the center characters are implemented as kerning-modified side bearings defining center character spacing within cell boundaries.

It should be appreciated that combination of features disclosed in different embodiments are also included within the scope of the present inventions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for displaying translation content of a translation engine performed on a computer having a processor, memory, and one or more code sets stored in the memory and executed in the processor, the method comprising:
   obtaining a foreign-language text (FLT);
   obtaining a translation text of the FLT, the translation text formed by translation characters;
   rendering the FLT into foreign-language (FL), framing characters, each of a plurality of the framing characters having a geometry defining a common counter width;
   designating a horizontal series of points in a display space defining placement of a series of receiving regions, the receiving regions having a width substantially equal to the counter width or a fractional multiple thereof;
   placing one translation character of the translation characters in each of two, adjoining receiving regions of the receiving regions, wherein an advance width of each of the one translation character is substantially equal to a width of its respective receiving region of the adjoining receiving regions, wherein each of the adjoining receiving regions is disposed within two adjacent FL framing characters of the framing characters,
   wherein each of the two adjacent FL framing character encloses its respective translation character on at least two sides; and
   displaying a composite text having the translation text disposed within the foreign-language text.

2. The method of claim 1, wherein the obtaining a foreign-language text is derived from voice recording or image capture.

3. The method of claim 1, wherein the counter width is identical for a plurality of the framing characters.

4. The method of claim 1, wherein each of a plurality of the framing characters having a character geometry defining a counter includes two vertical strokes devoid of a traversing stroke in between them obstructing viewing of the one translation character.

5. The method of claim 1, wherein the one translation character is displayed in a color or a weight different from that of the first FL framing character.

6. The method of claim 1, wherein the one translation character is displayed in a treatment different than that of the first FL framing character.

7. The method of claim 1, wherein one of the receiving regions is filled with a vertical stroke of a framing character, the vertical stroke having a width substantially equal to a receiving region.

8. The method of claim 1, wherein the displaying a composite text having the translation text is implemented is accordance with a pre-defined time period.

9. A method for displaying translation content of a translation engine performed on a computer having a processor, memory, and one or more code sets stored in the memory and executed in the processor, the method comprising:
obtaining a foreign-language text (FLT), the FLT having foreign-language characters;
obtaining a translation of the FLT;
rendering the translation into translation, framing characters, each of a plurality of the framing characters having a geometry defining a common counter width;
designating a horizontal series of points in a display space defining placement of a series of receiving regions, the receiving regions having a width substantially equal to the counter width or a fraction fractional multiple thereof;
placing one of the foreign-language characters of the foreign-language characters in each of two, adjoining receiving regions of the receiving regions,
wherein an advance width of each one of the foreign-language characters is substantially equal to a width of its respective receiving region of the adjoining receiving regions,
wherein each of the adjoining receiving regions is disposed within two adjacent translation framing characters of the framing characters,
wherein each of the two adjacent translation framing character encloses its respective FLT character on at least two sides; and
displaying a composite text having the foreign-language text disposed within the translation text.

10. The method of claim 9, wherein the obtaining a foreign-language text is derived from voice recording or image capture.

11. The method of claim 9, wherein the counter width is identical for a plurality of the framing characters.

12. The method of claim 9, wherein each of a plurality of the framing characters having a character geometry defining a counter includes two vertical strokes devoid of a traversing stroke in between them obstructing viewing of the one translation character.

13. The method of claim 9, wherein one of the receiving regions is filled with a vertical stroke of a framing character, the vertical stroke having a width substantially equal to a receiving region.

14. A rendering engine with composite-text display functionality, the engine comprising:
an input device configured to capture foreign-language content;
a processor operative to:
render the foreign-language content into textual, foreign-language (FL)framing characters, each of a plurality of the framing characters having a geometry defining a common counter width;
obtain a translation text of the foreign-language text, the translation text formed by translation characters;
designate a horizontal series of points in a display space defining placement of a series of receiving regions, the receiving regions having a width substantially equal to the counter width or a fraction fractional multiple thereof;
place one translation character of the translation characters in each of two, adjoining receiving regions of the receiving regions,
wherein an advance width of each of the one of the translation characters is substantially equal to a width of its respective receiving region of the adjoining receiving regions,
wherein each of the adjoining receiving regions is disposed within two adjacent FL framing characters of the framing characters, wherein each of the two adjacent FL framing character encloses its respective translation character on at least two sides; and
an output device configured to display a composite text of the translation text disposed within the foreign-language text.

15. The rendering engine of claim 14, wherein the input device is implemented as a microphone or a camera.

16. The rendering engine of claim 14, wherein the output device is implemented as
a printer or a display screen.

17. The rendering engine of claim 16, wherein the display screen configured to display the translation text for a pre-defined time period.

18. A rendering engine with composite-text display functionality, the engine comprising:
an input device configured to capture foreign-language content;
a processor operative to:
render the foreign-language content into foreign-language characters;
obtain a translation of the foreign-language content;
render the translation into translation framing characters, each of a plurality of the framing characters having a geometry defining a common counter width;
designate a horizontal series of points in a display space defining placement of a series of receiving regions, the receiving regions having a width substantially equal to the counter width or a fractional multiple thereof;
place one foreign-language characters of the foreign-language characters in each of two, adjoining receiving regions of the receiving regions,
wherein an advance width of each of the one of foreign-language characters is substantially equal to a width of its respective receiving region of the adjoining receiving regions,
wherein each of the adjoining receiving regions is disposed within two adjacent translation framing characters of the framing characters,
wherein each of the two adjacent translation character encloses its respective FLT character on at least two sides; and an output device configured to display a composite text of the foreign-language inside the translation framing text.

19. The rendering engine of claim 18, wherein the output device is implemented as a display screen.

20. The rendering engine of claim 19, wherein the display screen is configured to display the translation framing characters until receipt of a user input.

* * * * *